United States Patent Office 3,557,149
Patented Jan. 19, 1971

3,557,149
α-BROMOALKYLMETHANODIOXOCINS
Chun-Shan Wang, Midland, and Henry E. Hennis, Coleman, Mich., assignors to The Dow Chemical Company, Midland, Mich., a corporation of Delaware
No Drawing. Filed Mar. 25, 1968, Ser. No. 715,487
Int. Cl. C07d 7/20
U.S. Cl. 260—345.2                         9 Claims

ABSTRACT OF THE DISCLOSURE

New α-bromoalkylmethanodioxocins having the formula

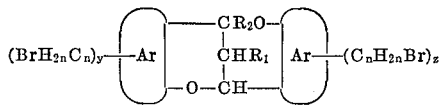

where each of $n$, $y$ and $z$ independently is an integer of from 0 to 4, inclusive; Ar is a homocyclic or heterocyclic substituted or unsubstituted aromatic ring; and each of $R_1$ and $R_2$ independently is H, alkyl or aryl, are made by a process which comprises contacting their corresponding alkylmethanodioxocins with a brominating agent in the presence of a free radical initiating catalyst where the temperature is between 0° and 100° C. These α-bromoalkylmethanodioxocins have biological activity and are useful resin starting materials.

CROSS-REFERENCE TO RELATED APPLICATIONS

The new compounds produced by this process are related to the compounds disclosed in the application by one of us, Hennis, entitled "Methanodioxocins and a Process for Making Them," Ser. No. 669,694, filed Sept. 22, 1967.

BACKGROUND OF THE INVENTION

It is known that an exchange reaction between the benzylic hydrogen of certain mono-nuclear aromatic compounds and the bromine in a brominating agent will occur in the presence of free radical initiating catalysts. See U.S. 3,190,825.

SUMMARY OF THE INVENTION

It has now been found that new α-bromoalkylmethanodioxocins are made by a process which comprises contacting their corresponding alkylmethanodioxocins with a brominating agent in the presence of a free radical initiating catalyst at temperatures between 0 and 100° C. This particular hydrogen substitution occurs even though there are other aliphatic hydrogen atoms available on the poly-nuclear dioxocin ring system. Moreover, the carbon-oxygen bonds of the dioxocin ring system are not broken even though a side product of this reaction, HBr, is known to break ether linkages.

The new α-bromoalkylmethanodioxocins produced by this process are those having the formula:

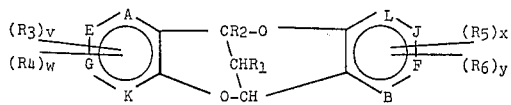

where each of $v$, $w$, $x$ and $y$ independently is an integer of from 0 to 4, inclusive; each of A, B, E, F. G, J, K and L independently is N or CH provided that neither A and E, E and G, G and K, B and F, F and J nor J and L can simultaneously be N; each of $R_1$ and $R_2$ independently is H, alkyl having up to eighteen carbon atoms or phenyl; each of $R_3$, $R_4$, $R_5$ and R independently is α-bromoalkyl having up to eighteen carbon atoms, t-alkyl of up to six carbon atoms, phenyl, halogen, nitro, carboxyl, alkoxy having up to eighteen carbon atoms or phenoxy, provided that at least one of $R_3$, $R_4$, $R_5$ and $R_6$ is α-bromoalkyl and is attached to a carbon atom; and $R_3$ combined with $R_4$, as well as $R_5$ combined with $R_6$, together with the atoms to which they are attached may form the pyridine, pyrimidine, quinoline, benzene, naphthalene, anthracene, phenanthrene or pyran ring. An example of a specific new α-bromoalkylmethanodioxocin produced by this process is 2-bromomethyl-6H,12H-6,12-methanodibenzo[b,f][1,5]dioxocin or a shorter term, 2-bromomethyl-MDBD

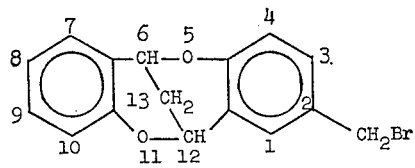

which is produced from its corresponding algylmethanodioxocin, 2-methyl-MDBD. The numbering system used herein is that shown in the above formula.

In order to produce these α-bromoalkylmethanodioxocins, an algylmethanodioxocin corresponding to the α-bromoalkylmethanodioxocin desired is reacted by contract, in any convenient manner, with a brominating agent in the presence of a free radical initiating catalyst at a temperature between 0 and 100° C. If desired, this reaction can be carried out in the presence of an inert solvent. After reaction, the desired product is separated from product mixture by conventional methods, e.g. filtration and distillation. The crude product can then be purified by recrystallization from a suitable solvent, e.g. carbon tetrachloride.

The alkylmethanodioxocin starting materials are produced by the reaction of a suitable o-vinylhydroxy aromatic compound with an appropriate o-hydroxyaldehyde aromatic compound as is more fully set out in the copending application by Hennis entitled "Methanodioxocins and a Process for Making Them," Ser. No. 669,694, filed Sept. 22, 1967, the disclosure of which is hereby incorporated by reference.

The brominating agent can be any bromine-containing agent that will provide bromine for the exchange reaction between bromine and the α-hydrogen of the alkylmethanodioxocin. Typical of these well-known brominating agents include bromine, bromine-chloride, carbon tetrabromide, bromotrichloromethane, N-bromosuccinimide, dibromodichloromethane, N-bromophthalimide, 1-bromo-1,1-dichloroethane and their mixtures.

The free radical initiating catalyst useful to this invention are those that will form sites for free radical addition to the α-position of the alkylmethanodioxocin starting material. Suitable catalysts include the azo catalysts, e.g. azobisisobutyronitrile; the alkyl peroxides, e.g. lauryl peroxide, di-tert-butyl peroxide; and the acyl peroxides, e.g. benzoyl peroxide and dibenzoyl peroxide. In general, it is advantageous to use a molar ratio of catalyst to brominating agent of between 1:10 and 1:1000.

It is preferred to conduct the reaction in the presence of a solvent that is inert to the reactants and reaction conditions. Typical of the solvents suitable for this process are benzene, carbon tetrachloride, methylene chloride and chlorobenzene.

The operable temperature and pressure ranges for this process are quite broad. It is preferred to use atmospheric pressure, although both subatmospheric and superatmospheric pressure can be employed. It is preferred to conduct the reaction at a temperature between 0 and 100°

C. and most preferred to operate at the reflux temperature of the reaction mixture.

The α-bromoalkylmethanodioxocins produced by this process have biological activity. For example, they are useful insecticides. They are also useful as resin intermediates. For example, the poly-α-bromoalkylmethanodioxocins are converted to useful polyester resins by reactions with metal salts of dibasic acids. Specifically, the reaction between a dibromoalkyl MDBD, e.g. 2,8-dibromomethyl-MDBD, and an equal molar amount of sodium phthalate in the presence of a catalytic amount of triethylamine and an inert solvent, e.g. acetone, at a temperature between 50 and 150° C. for one to six hours gives a polyester which has special utility in the coatings industry, especially in alkyd type formulations.

DESCRIPTION OF SPECIFIC EMBODIMENT

Example 1

2-bromomethyl-MDBD.—2-methyl-MDBD (2.38 g., 0.01 mole) was dissolved in 40 ml. of benzene and the mixture was heated to reflux. N-bromosuccinimide (1.78 g., 0.01 mole) with 0.3 g. of benzoyl peroxide was added to the refluxing solution and the mixture was kept at reflux for four more hours. The reaction mixture was cooled with water, followed by ice-water; the then precipitated succinimide was removed by filtration. The filtrate was then distilled to dryness and the residue recrystallized from carbon tetrachloride after activated carbon treatment to give white plates. Two recrystallizations from carbon tetrachloride gave white plates, M.P. 135–140°, yield 1.5 g. (47.3%).

Calcd. for $C_{16}H_{13}BrO_2$ (percent): C, 60.57; H, 4.10; Br, 25.24. Found (percent): C, 60.7; H, 4.17; Br, 24.1.

This compound is a useful insecticide. Into water containing 5 parts per million of 2-bromomethyl-MDBD was placed yellow fever mosquito larvae. After 24 hours, there was observed a 100% mortality rate of the mosquito larvae placed into the solution.

Some other new α-bromoalkylmethanodioxocins made from their corresponding alkylmethanodioxocins are:

1-bromomethyl-MDBD from 1-methyl-MDBD;
3-α-bromoethyl-MDBD from 3-ethyl-MDBD;
4-α-bromopropyl-MDBD from 4-propyl-MDBD;
1-α-bromo-n-butyl-13-octadecyl-MDBD from 1-n-butyl-13-octadecyl-MDBD;
2-α-bromo-n-pentyl-13-phenyl-MDBD from 2-n-pentyl-13-phenyl-MDBD;
3-α-bromo-n-hexyl-6-octadecyl-MDBD from 3-n-hexyl-6-octadecyl-MDBD;
4-α-bromo-isopentyl-6-phenyl-MDBD from 4-isopentyl-6-phenyl-MDBD;
2,4-bis(α-bromoethyl)-8-(α-bromopropyl)-MDBD from 2,4-diethyl-8-propyl-MDBD;
4-(α-bromo-n-butyl)-10-bromomethyl-MDBD from 4-n-butyl-10-methyl-MDBD;
2,4,8,10-tetrabromomethyl-MDBD from 2,4,8,10-methyl-MDBD;
1,2,3,4,7,8,9,10-octabromomethyl-MDBD from 1,2,3,4,7,8,9,10-octamethyl-MDBD;
6-(α-bromoethyl)-8-(α-bromoethyl)-MDBD from 6,8-diethyl-MDBD;
2-phenyl-4-bromomethyl-MDBD from 2-phenyl-4-methyl-MDBD;
2-bromomethyl-13-hexyl-MDBD from 2-methyl-13-hexyl MDBD;
2-bromo-n-butyl-4-bromo-MDBD from 2-n-butyl-4-bromo-MDBD;
6,11 - dibromomethyl - 7H,13H-7,13-methano(1,5)benzodioxocino(3,4-c) - quinoline from 6,11 - dimethyl-7H,13H - 7,13-methano(1,5)benzodioxocino(3,4-c)-quinoline; and
9 - bromomethyl - 6H,12H - 6,12 - methano(1,5)benzodioxocino(3,4-c)-pyridine from 9-methyl-6H,12H,-6,12-methano(1,5)benzodioxocino(3,4-c)-pyridine.

Similarly, the α-bromoalkylmethanodioxocins given in Table I below are made from their corresponding alkylmethanodioxocins.

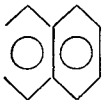

TABLE I

| R₃ | R₄ | R₅ | R₆ | R₃+R₄ | R₅+R₆ | A | B | E | F | G | J | K | L |
|---|---|---|---|---|---|---|---|---|---|---|---|---|---|
| Bromomethyl | | t-Hexyl | | | | CH | C | C | C | CH | CH | CH | C |
| | α-Bromoethyl | Phenyl | | | | CH | C | CH | CH | CH | C | C | C |
| α-Bromopropyl | | Chlorine | | | | C | C | CH | CH | CH | CH | CH | CH |
| | α-Bromo-n-butyl | Bromine | | | | CH | CH | CH | C | C | C | CH | C |
| α-Bromo-n-pentyl | | Nitro | | | | C | CH | C | C | CH | CH | C | CH |
| | α-Bromo-n-hexyl | Carboxyl | | | | C | CH | CH | C | C | CH | C | CH |
| α-Bromo-n-octadecyl | | n-Octadecoxy | | | | CH | CH | C | C | CH | CH | N | N |
| | Bromomethyl | Phenoxy | | | | N | N | C | C | N | N | CH | CH |
| Bromomethyl | | | | | | C | CH | N | N | CH | CH | CH | CH |

We claim:
1. An α - bromoalkylmethanodioxocin compound having the formula:

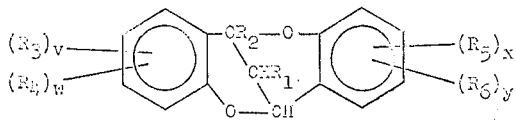

where each of $v$, $w$, $x$ and $y$ independently is an integer of from 0 to 4, inclusive; each of $R_1$ and $R_2$ independently is H, alkyl having up to eighteen carbon atoms or phenyl; each of $R_3$, $R_4$, $R_5$ and $R_6$ independently is α-bromoalkyl having up to eighteen carbon atoms, t-alkyl having up to six carbon atoms, phenyl, halogen, nitro, carboxyl, alkoxy having up to eighteen carbon atoms or phenoxy provided that at least one of $R_3$, $R_4$, $R_5$ and $R_6$ is α-bromoalkyl; and $R_3$ combined with $R_4$, as well as $R_5$ combined with $R_6$, together with the atoms to which they are attached may form the benzene, naphthalene, anthracene or phenanthrene ring.

2. A compound as defined in claim 1 wherein $R_3$, $R_4$, $R_5$ and $R_6$ are in the 2, 4, 8 and 10 positions.

3. A compound as defined in claim 1 wherein $R_3$ and $R_5$ are in the 2 and 8 positions and $R_4$ and $R_6$ are H.

4. The compound of claim 3 wherein $R_0$, $R_1$ and $R_2$ are H.

5. A compound as defined in claim 1 wherein $R_1$ is H or alkyl having up to eighteen carbon atoms.

6. A compound as defined in claim 1 wherein $R_2$ is H or alkyl having up to eighteen carbon atoms.

7. A compound as defined in claim 1 wherein $R_3$ and $R_4$ or $R_5$ and $R_6$, together with the carbon atoms to which they are attached, form a benzene, naphthalene, anthracene or phenanthrene ring.

8. A compound as defined in claim 1 wherein $R_1$, $R_2$, $R_4$, $R_5$ and $R_6$ are H.

9. 2-bromomethyl-MDBD, having the formula

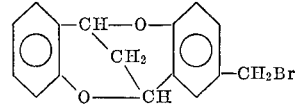

References Cited

Bahatia et al., Tetrahedron Letters, pp. 1717–20 (1966).

Westoo, Acta Chem. Scand., vol. 13, pp. 679–82 (1959).

Fuson, "Reactions of Organic Compounds," John Wiley & Sons, Inc., New York (1962), pp. 610–11.

HENRY R. JILES, Primary Examiner

J. M. FORD, Assistant Examiner

U.S. Cl. X.R.

260—75, 250, 256.4, 287, 288, 289, 295, 296, 297, 999